(12) United States Patent
Araya Arancibia et al.

(10) Patent No.: US 8,746,443 B2
(45) Date of Patent: Jun. 10, 2014

(54) DEVICE FOR CONTINUOUS HEIGHT REGULATION OF SIDEPIECES OF CONVEYOR BELTS

(75) Inventors: Pablo Araya Arancibia, Santiago (CL); Alex Harnaldo Castro Castro, Santiago (CL)

(73) Assignee: Ford Steel Chile S.A., Santiago (CL)

( * ) Notice: Subject to any disclaimer, the term of this patent is extended or adjusted under 35 U.S.C. 154(b) by 338 days.

(21) Appl. No.: 13/122,402

(22) PCT Filed: Oct. 1, 2009

(86) PCT No.: PCT/IB2009/054306
§ 371 (c)(1),
(2), (4) Date: Jun. 17, 2011

(87) PCT Pub. No.: WO2010/038214
PCT Pub. Date: Apr. 8, 2010

(65) Prior Publication Data
US 2011/0233032 A1    Sep. 29, 2011

(30) Foreign Application Priority Data

Oct. 3, 2008  (CL) .................................. 2958-2008

(51) Int. Cl.
*B65G 21/20*       (2006.01)
(52) U.S. Cl.
USPC ..................................... 198/836.1; 198/836.3
(58) Field of Classification Search
USPC .................... 198/836.1, 836.3, 818, 823, 837
See application file for complete search history.

(56) References Cited

U.S. PATENT DOCUMENTS 3,008,579 A * 11/1961 Bartlett ......................... 209/654
3,280,962 A * 10/1966 Stone et al. ................ 198/836.3
(Continued)

FOREIGN PATENT DOCUMENTS

| CL | 3040-2007 | 10/2007 |
| GB | 1566549 | 5/1980 |

(Continued)

OTHER PUBLICATIONS

Written Opinion cited in related International Patent Application No. PCT/IB2009/054306, completed Jan. 22, 2010.

(Continued)

*Primary Examiner* — Gene Crawford
*Assistant Examiner* — Matthew Marotta
(74) *Attorney, Agent, or Firm* — Foley & Lardner LLP

(57) ABSTRACT

The present invention relates to a device for adjusting the flanges in a conveyor belt structure (B) which comprises means (F) for fixing together a flange (C), the conveyor belt structure and said device; top support means (1) for fixing the device to the structure (B) of the conveyor belt with the fixing means (F); bottom support means (2) to which the flange (C) is fixed by means of the fixing means (F) passing through the conveyor belt structure (B); an adjusting screw (3) which allows raising or lowering of the flange (C); an adjusting nut (4) integral with the top support means (1) for allowing the upward or downward movement of the adjusting screw (3); a bush-holder (5) integral with the bottom support means (2); a bush (6) mounted in the bush-holder (5), for allowing rotation of the adjusting screw (3) relative to the bottom support means (2); a washer (7) for preventing friction between the adjusting screw (3) and the bush-holder (5); a lock-nut (8) for fixing the position of the adjusting screw (3); twisting means (9) for rotating said adjusting screw (3); and stop means (10) for supporting the bush (6), the bush-holder (5) and the bottom support means (2).

12 Claims, 8 Drawing Sheets

(56) References Cited

U.S. PATENT DOCUMENTS

| | | | |
|---|---|---|---|
| 4,641,745 A | | 2/1987 | Skates |
| 4,709,800 A | * | 12/1987 | Olsen .......................... 198/459.1 |
| 5,913,404 A | | 6/1999 | Bowman |
| 6,305,528 B1 | * | 10/2001 | Leonard ..................... 198/836.3 |

FOREIGN PATENT DOCUMENTS

| | | | | |
|---|---|---|---|---|
| GB | 2087337 | | 5/1982 | |
| JP | 8-20419 | | 1/1996 | |
| JP | 2003-252419 | | 9/2003 | |
| JP | 2007-238230 | | 9/2007 | |
| MX | PA02008157 A | | 12/2004 | |
| WO | WO 9109798 A1 | * | 7/1991 | ............. B65G 21/20 |

OTHER PUBLICATIONS

International Search Report cited in related International Patent Application No. PCT/IB2009/054306, completed Jan. 22, 2010.

* cited by examiner

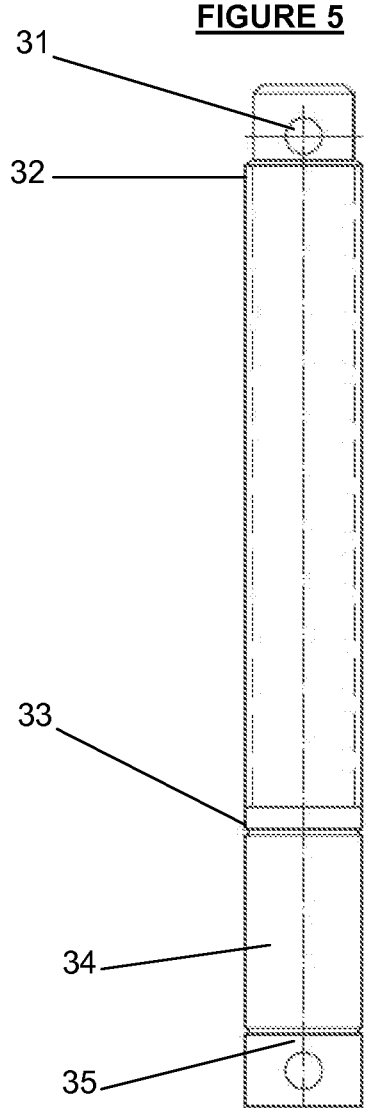

DEVICE FOR CONTINUOUS HEIGHT REGULATION OF SIDEPIECES OF CONVEYOR BELTS

TECHNICAL FIELD

The present invention is related to the material transport industry using conveyor belts and particularly to a device for continuous height regulation of sidepieces attached to a conveyor belt structure.

STATE OF THE ART

In the transport of bulk materials with different densities, specific weights, granulometry and hardness, in mining, construction and transport operations and the like, conveyor belts having different sizes and capacities are used. Both in load zones and in zones where material is transferred between conveyor belts (chutes), as well as along these zones, protection flaps (side pieces) are installed at both sides and longitudinally along the conveyor belt, with the purpose of keeping the transported material confined on the surface of the conveyor belt and avoiding the spillage thereof outside the conveyor belt to the structure, headings, floor, etc. However, the inherent operation of the conveyor belt causes the transported material to enter into the space between the belt and the side pieces, thereby generating strong abrasion of the side pieces, consequently wearing out the side pieces and therefore producing a growing separation between the belt and the side pieces, which prevents correct spillage protection and increases the amount of spilled material. On the one hand, the present applicant has developed a high-hardness sidepiece that resists the strong abrasion caused by the conveyed material, as set forth in the Patent Application CL 3040-2007, which considerably slows the growing separation between the belt and the sidepiece. Additionally, said high-hardness sidepiece must be precisely positioned above the conveyor belt. Hence, a sidepiece height regulation device attached to a conveyor belt structure is required to control this separation between the conveyor belt and the sidepieces.

In the previous art of the present invention, there are different devices for sidepiece height regulation such as, for example, the one described in U.S. Pat. No. 4,641,745, consisting in a support for flexible sidepieces, which are in contact with the side ends of conveyor belts and are suspended from the lateral walls of the conveyor belt frame by means of a vertically adjustable sidepiece support. Elongated plates hanged from the walls have U-shaped projections extending outward from the belt. U-shaped fastening hooks are disposed around the U-shaped projections. Clamps including ringbolts pass through the curve of said hooks with the rings arranged in slots formed in the curve of the projections.

U.S. Pat. No. 5,913,404 describes a conveyor belt system that uses a floating sealing sidepiece to prevent bulk material spillage from the belt, with a plurality of mechanisms used to exert a descending pressure along the upper edge of a sealing sidepiece. These forces press the sidepiece against the belt and maintain the seal between the sidepiece and the belt along the sidepiece.

The Mexican Patent Application MX PA2008157, entitled "Automatic Belt Flap for a Conveyor" and published on Dec. 13 2004, describes a conveyor belt that uses a mechanism to create a seal between the flap and the belt or to allow the flap to make a floating contact with the belt, independently of the directional movement of the belt.

TECHNICAL PROBLEM

As mentioned before, these devices and mechanisms are designed for sidepieces made of flexible materials where there is no contact between the side pieces and the conveyor belt to create a seal; however said flexible materials are quickly wearied out and are unsuitable for certain application, such as in the mining industry. Therefore, these devices or mechanisms have the disadvantage that they cannot be used with high-hardness abrasion-resistant materials. These sidepieces cannot contact the conveyor belt and require a minimal separation between them and the conveyor belt. Hence, the present invention describes a device that solves the technical problem of continuously separating the height of conveyor belt sidepieces.

SOLUTION TO THE PROBLEM

The present invention corresponds to a device for regulating sidepieces in a conveyor belt structure (B) that comprises attachment means (F) between a sidepiece (C), the conveyor belt structure and said device; an upper support means (1) to fasten the device to the conveyor belt structure (B) using the attachment means (F); a lower support means (2) whereupon the sidepiece (C) is attached using the attachment means (F) through the conveyor belt structure (B); a regulation screw (3) to raise or lower the sidepiece (C); a regulation nut (4) jointly moving with the upper support means (1) to allow raising and lowering the regulation screw (3); a bushing holder (5) jointly moving with the lower support means (2); a bushing (6) installed inside the bushing holder (5) that allows the regulation screw (3) to rotate with respect to the lower support means (2); a washer (7) to avoid friction between the regulation screw (3) and the bushing holder (5); a counter-nut (8) to fix the position of the regulation screw (3); a torque means (9) to rotate said regulation screw (3); and an end butt means (10) to support the bushing (6), the bushing holder (5) and the lower support means (2).

ADVANTAGEOUS EFFECTS OF THE INVENTION

The present invention makes it possible to use and regulate high-hardness sidepieces in conveyor belts, thereby keeping a minimal and sufficient separation between the conveyor belt and the sidepiece without generating a contact between both elements, thus making feasible the use of high-hardness sidepieces with a much longer service life than sidepieces used in regulation devices from the previous art

BRIEF DESCRIPTION OF THE DRAWINGS

For a better understanding of the invention, preferred assemblies are described with reference to the accompanying figures, wherein:

FIG. 5 is a schematic view of a regulation screw of the present invention;

BEST EMBODIMENTS OF THE INVENTION

Figure 1:
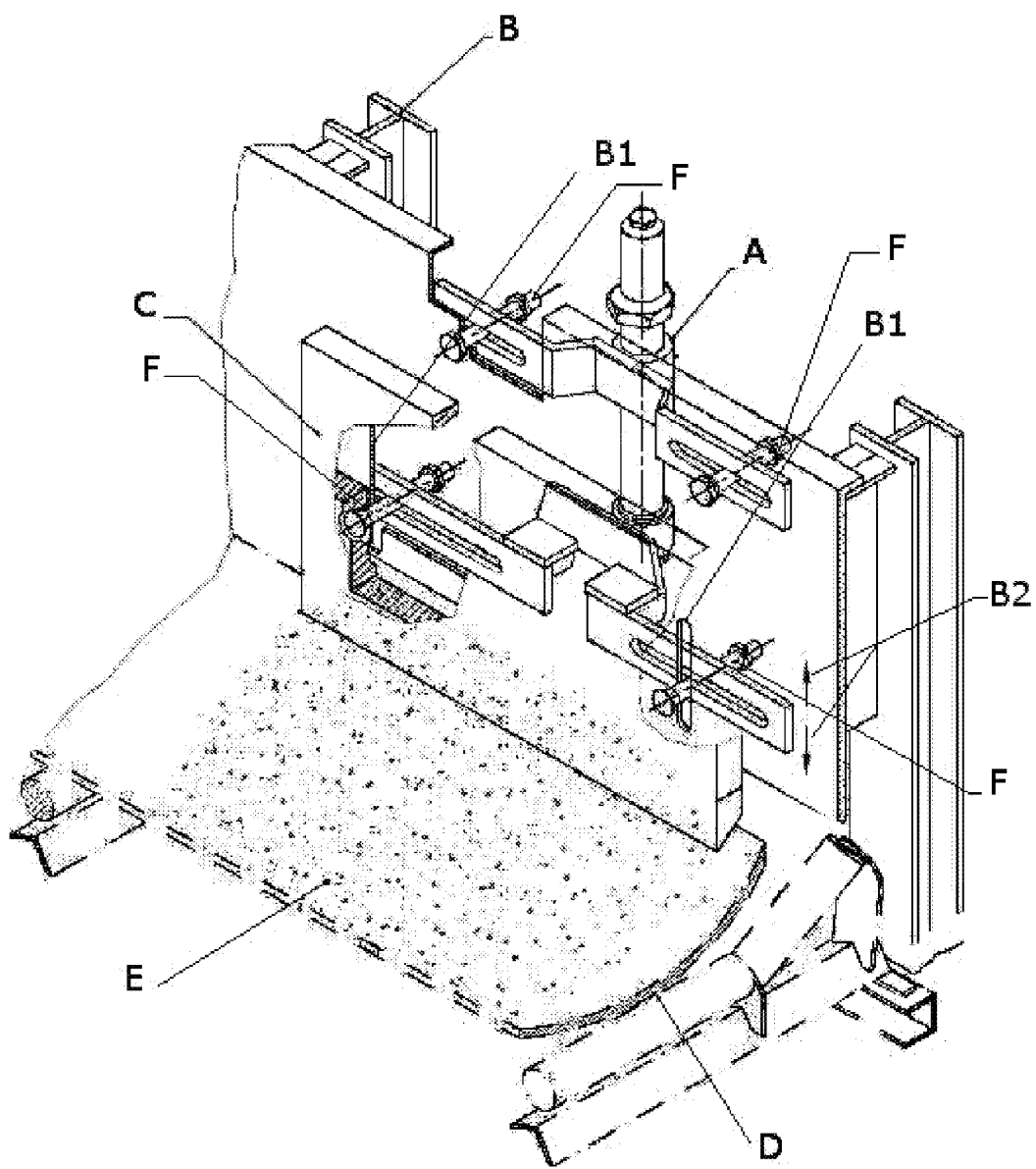
FIG. 1 is a schematic ensemble view of a first preferred assembly of the present invention installed on a conveyor belt with a respective 'short' high-hardness sidepiece.

Referring to FIG. 1, a first preferred assembly of the present invention consists of a device (A) for continuous height regulation of sidepieces attached to a conveyor belt structure. Said device (A) comprises an upper support means and a lower support means joined by a regulation screw that allows modifying the distance between both support means. In FIG. 1, the operation mode of the first assembly of the present invention can be appreciated, wherein said device (A) is attached to a conveyor belt structure (B) through the upper support means, and said device (A) hold a sidepiece (C) of a 'short' type (up to 800 mm long) close to the conveyor belt (D) to avoid the spillage of material (E) out of the conveyor belt (D). When the regulation screw is rotated, the sidepiece (D), which has been wearied out after a time period, is shifted toward the conveyor belt (D) as to recover a minimal separation between said sidepiece (C9 and the conveyor belt (D) and avoid spillage the spillage of material (E). Two vertical slots (B1) are present on the structure (B), with attachment means (F) passing therethrough, between the device (A) of the present invention and the sidepiece (C), to allow raising and lowering said sidepiece (C) through the structure (B).

Figure 2:
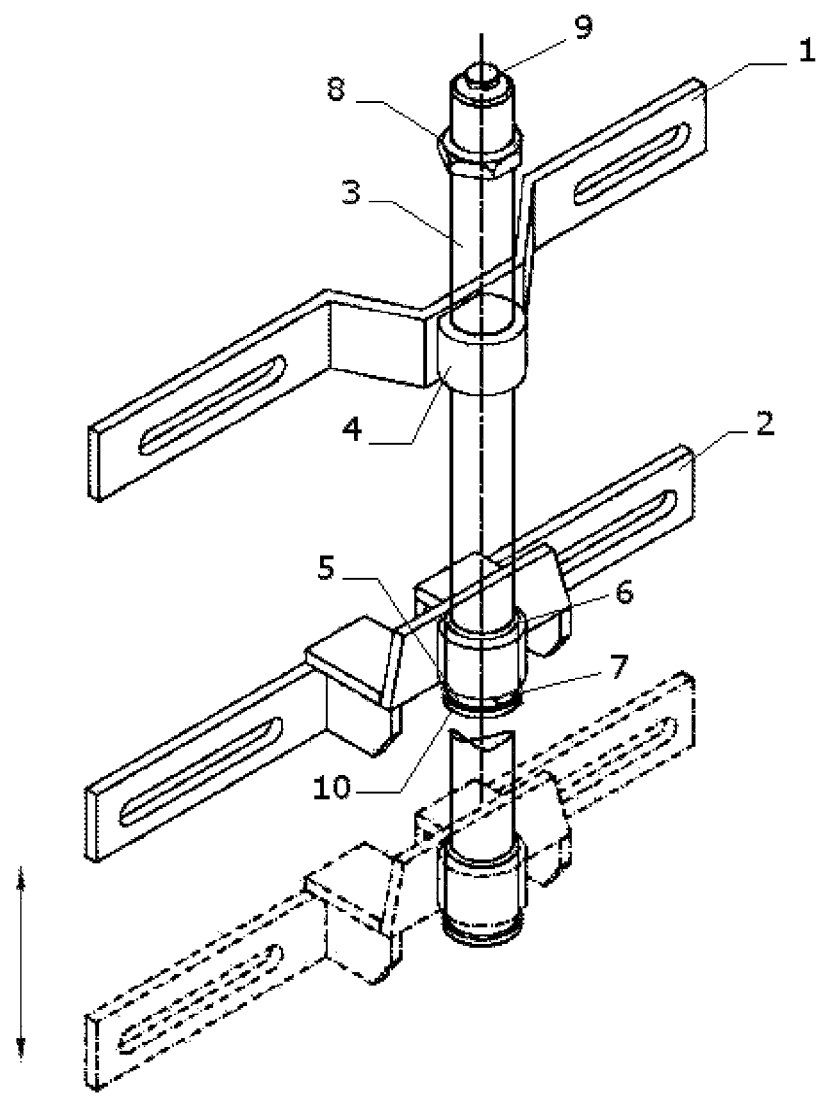
FIG. 2 is a schematic detailed view of the first preferred assembly of the present invention illustrated in FIG. 1.

Referring to FIG. 2, different components of the device can be appreciated according to a first assembly of the present invention, wherein a device for continuous height regulation of sidepieces attached to a conveyor belt structure is shown, comprising: attachment means (F), such as e.g. bolts, washers and nuts between the sidepiece, the conveyor belt structure and the device according to the present invention; an upper support means (1) to attach the device on the conveyor belt structure (B) using the attachment means (F); a lower support means (2) upon which the sidepiece (C) is attached by means of the attachment means through the conveyor belt structure (B) wherein vertical slots (B1) have been formed through which the attachment means (F) pass allowing raising and lowering the lower support means and therefore also the sidepiece (C); a regulation screw (3) to raise or lower the sidepiece (C) shown in FIG. 1; a regulation nut (4) jointly moving with the upper support means (1) to allow raising and lowering the regulation screw (3); a bushing holder (5) jointly moving with the lower support means (2); a bushing (6), particularly a Teflon, polyethylene or nylon bushing, placed inside the bushing holder (5) that allows the regulation screw (3) to rotate with respect to the lower support means (2); a washer (7), particularly a Teflon, polyethylene or nylon washer, to avoid the friction between the regulation screw (3) and the bushing holder (5); a counter-nut (8) to fix the position of the regulation screw (3); a torque means (9), such as e.g. a nut, to rotate the regulation screw (3) to raise or lower the sidepiece (C) of FIG. 1; and an end butt means (10) to support the bushing (6), the bushing holder (5) and the lower support means (2).

In reference to FIG. 5, a regulation screw (3) of the device according to the present invention can be appreciated with more details, which consists in a male threaded axle (32) with the same threading step of the female threads of the regulation nut (4) and the counter-nut (8), with torque means (9) in the upper and lower ends of said axle that allow easily rotating said regulation screw, such as e.g. a perforation (31) to insert a crowbar and rotate the regulation screw using said crowbar, according to another aspect of the present invention. In the lower portion of the regulation screw (3), the male thread ends in an annular slot (33) into which a Seeger safety washer is inserted to prevent the displacement of the upper support means (1). Below said slot (33), the regulation screw continues as an axle portion (34) with a lower diameter substantially similar to the internal diameter of the bushing (6) and the washer (7); said axle portion (34) ends at a butt end means (10) such as e.g. a second annular slot (35) in which a Seeger safety washer is inserted with an external diameter that prevents the displacement of the lower support means (2, 2'). Said regulation screw (3) can be fabricated using different fabrication techniques, such as by lathing or thread lamination.

Figure 6A:
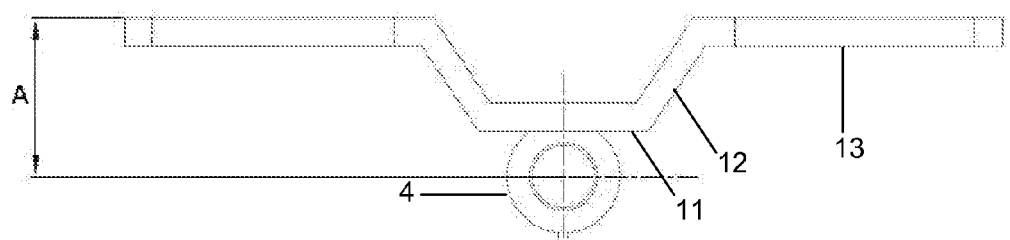
FIG. 6A is a top view.
Figure 6B:
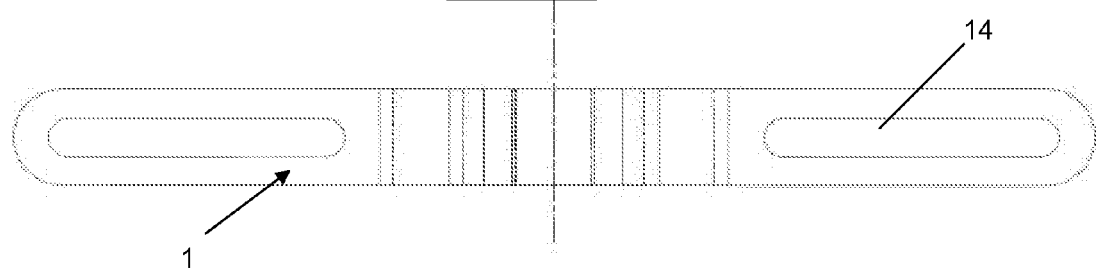
FIG. 6B is a front view and FIG. 6C is a side view of an upper support according to the present invention.
Figure 6C:
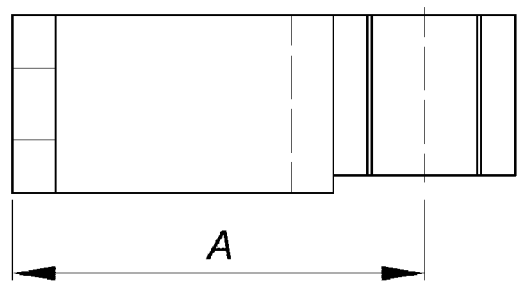

As it can be appreciated in FIGS. 6A, 6B and 6C, the upper support means is substantially yoke-shaped. In FIG. 6A it can be appreciated that the support means (1) comprises a base (11) upon which the regulation nut (4) is attached, said base (11) projecting from its side ends in two projections (12) in opposing diagonal directions departing from the regulation screw (not shown in these Figures) toward the sidepiece and perpendicular to the regulation screw axe; said projections (12) comprising a fold that orient the projections (12) in an end section (13) parallel to the sidepiece. Each of said end sections (13) comprises a longitudinal slot (14) for the attachment means (not shown in these Figures) to affix and fasten the upper support means (1) to the conveyor belt structure (not shown in these Figures). The length of the slot (14) extends along the major part of the end section (13) of the upper support means (1) as to longitudinally accommodate the continuous regulation device according to the present invention. Preferably, the length of the slot (14) is at most 80% of the length of the end section (13).

Figure 7A:
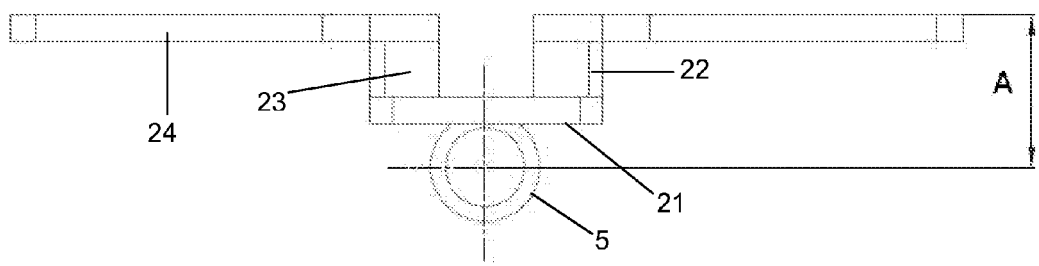
FIG. 7A is a top view.
Figure 7B:
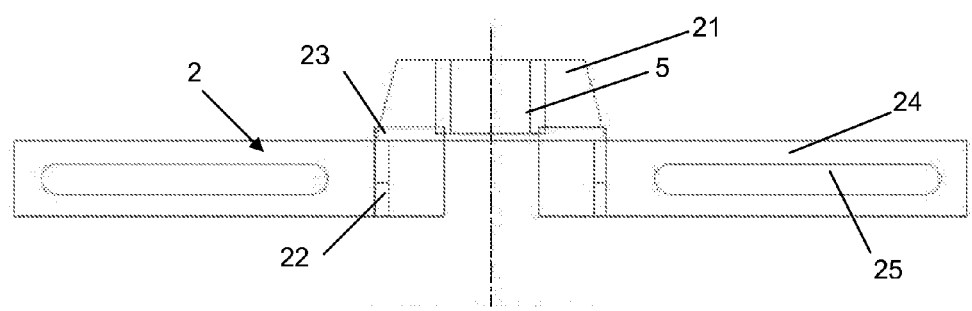
FIG. 7B is a front view and FIG. 7C is a side view of a lower support according to a first assembly of the present invention.
Figure 7C:
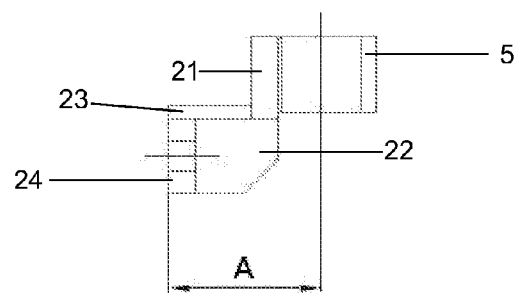

With respect to an aspect of the present invention, the lower support means (2) according to a first assembly of the invention is shown in FIGS. 7A, 7B and 7C, which is substantially yoke-shaped, i.e. comprises a base (21) jointly moving tangentially to the bushing holder (5), said base (21) including two horizontal projections (23) in its lower end departing from the regulation screw (not shown in these Figures) toward the sidepiece and perpendicular to the regulation screw, located at both sides of said lower end; each of these projections (23) comprising a vertical reinforcement (22) perpendicular to and jointly moving with the lower side of said projections (23), each projection (23) and reinforcement (22) being affixed to move jointly to an end section (24) parallel to the sidepiece, in such a way as to separate the lower section of the regulation screw from the conveyor belt. Each of said end sections (24) comprises a longitudinal slot (25) for the attachment means (not shown in these Figures) to affix and fasten the lower support means (2) to the conveyor belt sidepiece (no shown in these Figures).

As it can be appreciated in FIG. 1, the attachment means (F) pass through the vertical slots (B1) formed on the structure (B). Said vertical slots (B1) allow the attachment means (F) to be displaced between the lower support means (2) and the sidepiece (C) in such a way as to raise or lower said sidepiece (C) as the regulation screw (3) is rotated, as indicated by arrows (B2). The length of the slot (25) extends along the major part of the end section (24) of the lower support means (2) as to longitudinally accommodate the continuous regulation device according to the present invention. Preferably, the length of the slot (25) is at most 80% of the length of the end section (24).

EMBODIMENT OF THE INVENTION

Figure 3:
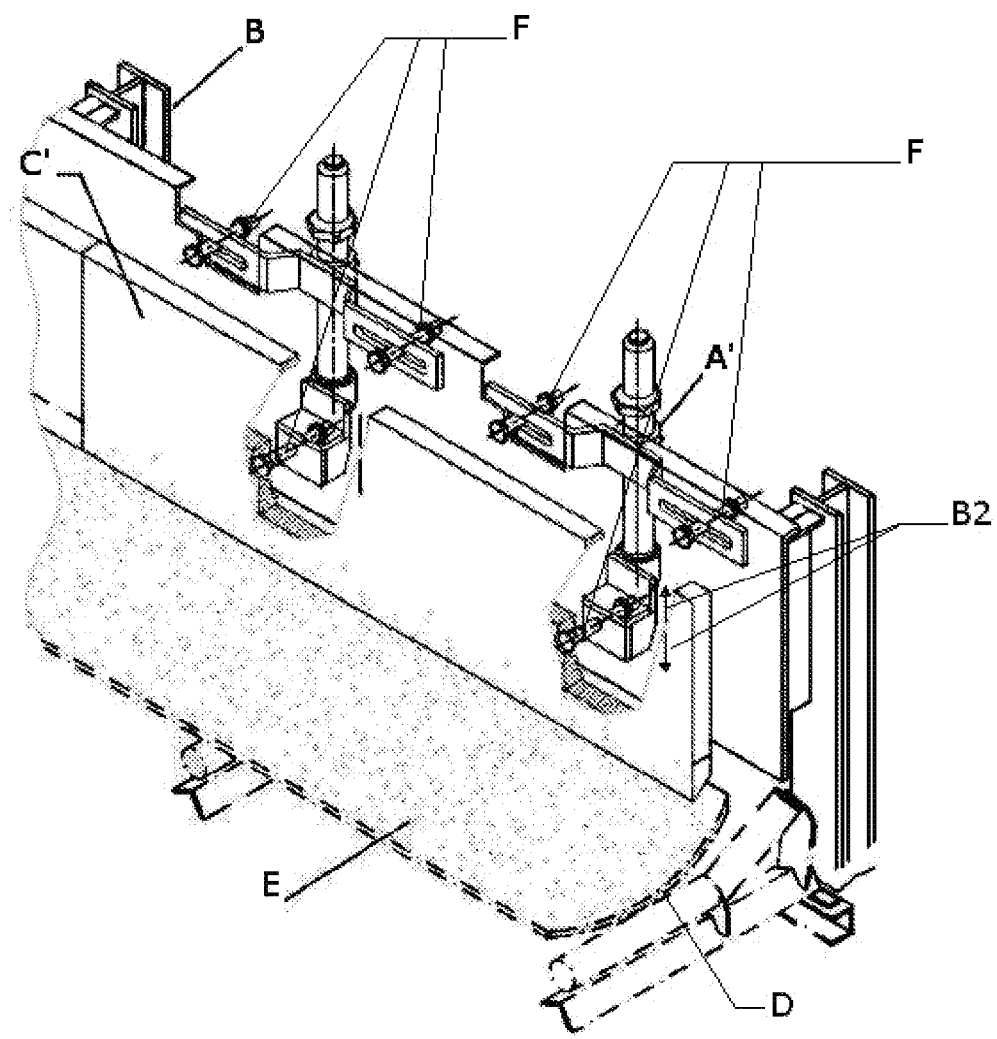
FIG. 3 is a schematic ensemble view of a second preferred assembly of the present invention installed on a conveyor belt with a respective 'long' high-hardness sidepiece.

In reference to FIG. 3, a second assembly of the present invention is shown, wherein two devices (A') are used for the continuous regulation of conveyor belt sidepieces installed on the structure (B) of the conveyor belt (D) attached to a 'long' type (up to 1,600 mm long) sidepiece (C') to prevent material (E) spilling out of the conveyor belt (D). To raise or lower said sidepiece (C') the respective screw of each device (A') successively installed should be rotated, taking care not to excessively lower one side of said sidepiece (C') before lowering the other side to avoid jamming the sidepiece (C').

Figure 4:
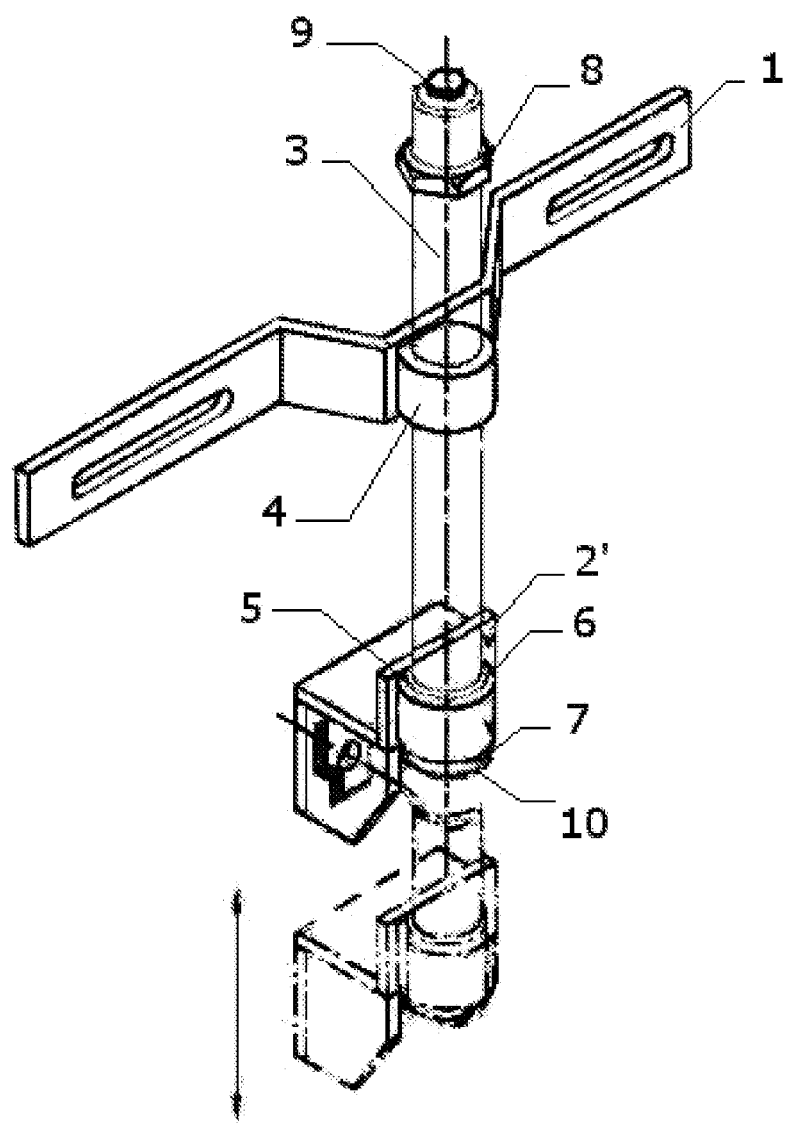
FIG. 4 is a detailed schematic view of the second preferred assembly of the present invention shown in FIG. 3.

FIG. 4 shows the continuous sidepiece regulation device according to a second aspect of the present invention shown in FIG. 3, wherein the lower support means (2') consists in a base tangentially attached to the bushing holder (5) including a projection perpendicular to the sidepiece at the lower end of said bushing holder, the end of said projection comprising a base perpendicular to said projection, descending and parallel to the sidepiece, to separate the lower section of the screw (3) from the conveyor belt, said base comprising a perforation for attachment means of the sidepiece.

Figure 8A:
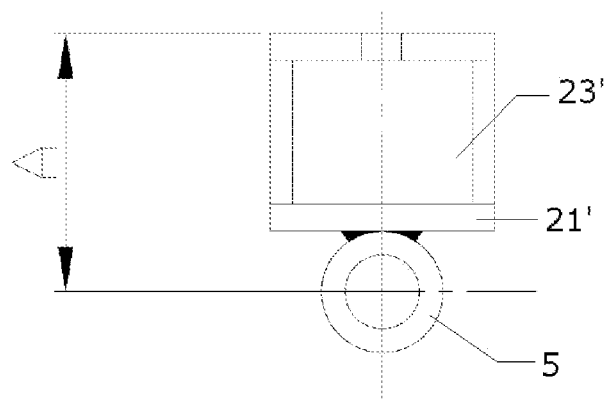
FIG. 8A is a top view.
Figure 8B:
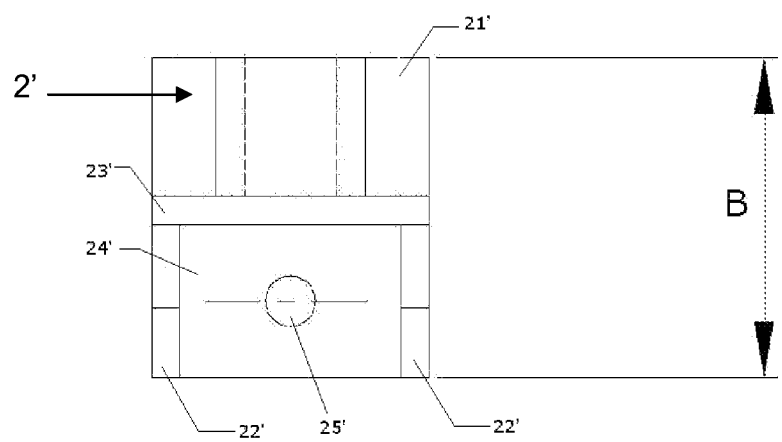
FIG. 8B is a front view and FIG. 8C is a side view of a lower support according to a second assembly of the present invention.
Figure 8C:
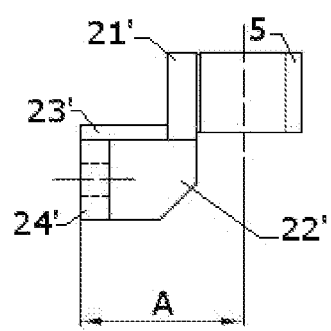

With respect to another aspect of the present invention, the lower support means (2') according to the second assembly of the present invention is shown in FIGS. 8A, 8B and 8C, wherein said lower support means comprises a base (21') jointly tangentially moving with the bushing holder (5), said base (21') including at its lower end a horizontal projection (23') departing from the regulation screw (not shown in these Figures) toward the sidepiece and perpendicular to the regulation screw; said projection (23') comprises, at each side end, a vertical reinforcement (22') perpendicular to and jointly moving with the lower side of said projection (23'). At the opposing side of the base (21') of said projection (23') and moving jointly with the vertical reinforcements (22'), a support (24') is attached parallel to the sidepiece, in such a way as to separate the lower section of the regulation screw from the conveyor belt. Said support (24') comprises a central perforation (25') to allow the attachment means (not shown in these Figures) to fasten the lower support (2') to the long-type sidepiece (C') of the conveyor belt (D).

The preceding description has been set forth for illustrative and descriptive effects and diverse changes and modifications should be evident for someone skilled in the art. The description is not intended to be exhaustive or to limit the invention to the disclosed illustrative assemblies. Such changes and modifications can be realized without departing from the spirit and scope of the invention and without decreasing the advantages provided.

INDUSTRIAL APPLICABILITY

The present invention finds special application in the bulk transport industry for the disposition and regulation of high-hardness sidepieces in conveyor belts for especially abrasive bulk materials.

We claim:

1. A device for the regulation of sidepieces in a conveyor belt structure wherein said device comprises:
    an attachment element disposed between a sidepiece, the conveyor belt structure and the device;
    an upper support configured to attach the device on the conveyor belt structure using the attachment element;
    a lower support upon which the sidepiece is attached, via the attachment element, through the conveyor belt structure;
    a regulation screw configured to raise or lower the sidepiece;
    a regulation nut configured to move jointly with the upper support to allow raising or lowering of the regulation screw;
    a bushing holder configured to move jointly to the lower support;
    a bushing installed in the bushing holder configured to allow the regulation screw to rotate with respect to the lower support;
    a washer configured to prevent friction between the regulation screw and the lower support;
    a counter-nut configured to fix the position of the regulation screw;
    a torque element configured to rotate said the regulation screw; and
    a butt end configured to support the bushing, the bushing holder and the lower support.

2. The device according to claim 1, wherein the lower support comprises a base attached to and configured to jointly move tangentially to the bushing holder, the base including two horizontal projections in its lower end departing from the base toward the sidepiece and perpendicular to the regulation screw, located at both sides of the lower end; each of the projections comprising a vertical reinforcement perpendicular to and configured to jointly move with the lower side of the projections, each projection and reinforcement being affixed to move jointly to an end section parallel to the sidepiece, wherein each of the end sections comprises a longitudinal slot.

3. The device according to claim 2, wherein a length of the slot extends up to 80% of a length of the end section of the lower support.

4. The device according to claim 1, wherein the lower support comprises a base configured to jointly tangentially move with the bushing holder, the base including at its lower end a horizontal projection departing from the regulation screw toward the sidepiece and perpendicular to the regulation screw; the projection comprising, at each side end, a vertical reinforcement perpendicular to and configured to jointly move with the lower side of the projection ; wherein at an opposing side of the base of the projection and moving jointly with the vertical reinforcements, a support is attached parallel to the sidepiece, the support comprising a central perforation configured to allow the attachment element to fasten the lower support to the sidepiece.

5. The device according to claim 1, wherein the attachment element comprises a bolt, a washer, and a nut.

6. The device according to claim 1, wherein the bushing and the washer are made of Teflon, polyethylene or nylon.

7. The device according to claim 1, wherein the torque element comprises a nut disposed in the upper part of the regulation screw, the nut configured to jointly move with the regulation screw.

8. The device according to claim 1, wherein the regulation screw comprises a male threaded axle with a same threading step as female threads regulation nut and the counter-nut, with the torque element in the upper and lower ends of the axle; in the lower portion of the regulation screw, the male thread ends in an annular slot into which a Seeger safety washer is inserted to prevent the displacement of the upper support; below the slot, the regulation screw continues as an axle portion with a lower diameter substantially similar to an internal diameter of the bushing and the washer; the axle portion ending at the butt end that prevents the displacement of the lower support.

9. The device according to claim 1, wherein the torque element comprises a perforation in the upper and/or lower end of the regulation screw and a crowbar that is inserted into the perforation and configured to rotate the regulation screw.

10. The device according to claim 1, wherein the butt end comprises a Seeger safety washer.

11. The device according to claim 1, wherein the upper support comprises a base upon which the regulation nut is attached, wherein the base projects from its side ends in two projections in opposing diagonal directions departing from the regulation screw toward the sidepiece and perpendicular to the regulation screw axle; the projections comprising a fold configured to orient the projections in an end section parallel to the sidepiece, each of the end sections comprising a longitudinal slot for the attachment element to affix and fasten the upper support.

12. The device according to claim 11, wherein a length of the slot extends up to 80% of a length of the end section.

\* \* \* \* \*